(12) United States Patent
Mutsuda et al.

(10) Patent No.: US 9,759,109 B2
(45) Date of Patent: Sep. 12, 2017

(54) ELECTRICALLY HEATED CATALYTIC CONVERTER

(71) Applicants: IBIDEN CO., LTD., Ogaki-shi (JP); TOYOTA JIDOSHA KABUSHIKI KAISHA, Toyota-shi (JP)

(72) Inventors: Fumiyuki Mutsuda, Ibi-gun (JP); Hideyuki Komitsu, Toyota (JP); Shoji Ogimura, Toyota (JP)

(73) Assignees: IBIDEN CO., LTD., Ogaki-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 177 days.

(21) Appl. No.: 14/922,197

(22) Filed: Oct. 26, 2015

(65) Prior Publication Data
US 2016/0115841 A1    Apr. 28, 2016

(30) Foreign Application Priority Data

Oct. 28, 2014 (JP) ................................. 2014-219389

(51) Int. Cl.
*B01D 50/00* (2006.01)
*F01N 3/20* (2006.01)
*F01N 13/14* (2010.01)

(52) U.S. Cl.
CPC .......... *F01N 3/2013* (2013.01); *F01N 13/14* (2013.01); *F01N 2470/24* (2013.01); *F01N 2510/02* (2013.01); *Y02T 10/26* (2013.01)

(58) Field of Classification Search
CPC ...... F01N 3/2026; F01N 3/2013; F01N 13/14; F01N 2470/24; F01N 2510/02
(Continued)

(56) References Cited

U.S. PATENT DOCUMENTS

| 5,070,694 A * | 12/1991 | Whittenberger | ...... F01N 3/2026 |
| | | | 422/174 |
| 2013/0011305 A1* | 1/2013 | Murata | ................... B01D 53/88 |
| | | | 422/174 |

(Continued)

FOREIGN PATENT DOCUMENTS

| EP | 2889338 | 7/2015 |
| EP | 2995789 | 3/2016 |
| JP | 2013-185573 | 9/2013 |

*Primary Examiner* — Tom P Duong
(74) *Attorney, Agent, or Firm* — Mori & Ward, LLP

(57) ABSTRACT

The present invention provides a highly durable, electrically heated catalytic converter including an inner tube on which an insulation layer is formed, wherein the insulation layer is less susceptible to damage such as cracking and peeling even when thermal stress occurs in a curvature section of the inner tube where the insulation layer is formed. The present invention provides an electrically heated catalytic converter for purifying exhaust gas, the electrically heated catalytic converter including a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube includes one or more curvature sections curved so as to outwardly project and extended sections connected to the one or more curvature sections, an insulation layer including an amorphous inorganic material is formed at least on an inner surface of the one or more curvature sections and the extended sections of the inner tube, the one or more curvature sections include a first curvature section located closest to the catalyst carrier, the first curvature section has a first curvature section insulation layer formed thereon, the first
(Continued)

curvature section insulation layer having a thickness of 100 to 400 μm, the extended sections include a first extended section connected to the first curvature section and adjacent to the catalyst carrier, the first extended section has a first extended section insulation layer formed thereon, and the thickness of the first curvature section insulation layer is greater than 1 time to less than 1.4 times the thickness of the first extended section insulation layer.

10 Claims, 3 Drawing Sheets

(58) Field of Classification Search
USPC .......................................... 422/174; 60/300
See application file for complete search history.

(56) References Cited

U.S. PATENT DOCUMENTS

| | | | | |
|---|---|---|---|---|
| 2013/0183205 A1* | 7/2013 | Yoshioka | .............. | F01N 3/2026 422/199 |
| 2013/0209321 A1* | 8/2013 | Yoshioka | .............. | F01N 3/2013 422/174 |
| 2013/0305698 A1* | 11/2013 | Yoshioka | .............. | F01N 3/2026 60/300 |
| 2013/0306623 A1* | 11/2013 | Kumagai | .............. | F01N 3/2026 219/534 |
| 2014/0216019 A1* | 8/2014 | Yoshioka | .............. | F01N 3/2026 60/300 |

* cited by examiner

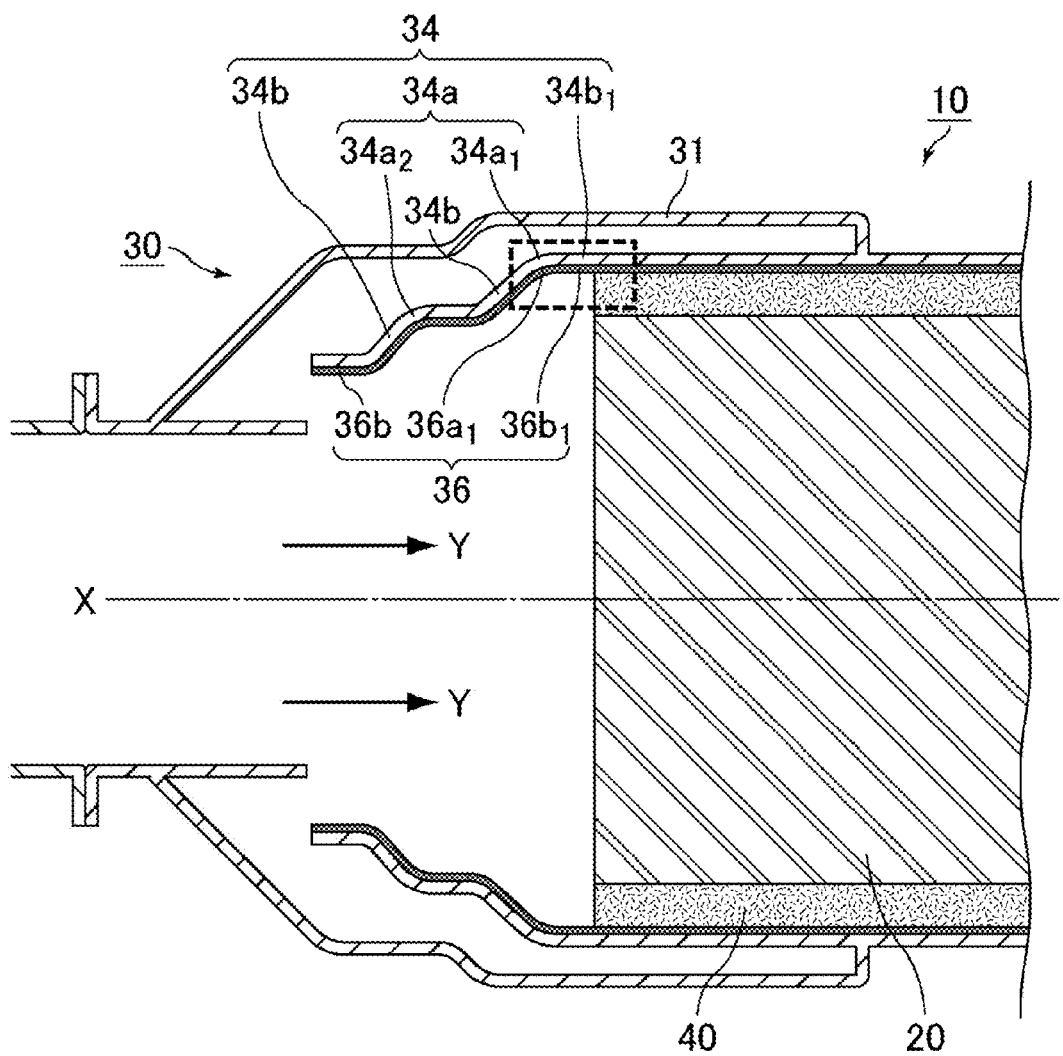

ELECTRICALLY HEATED CATALYTIC CONVERTER

TECHNICAL FIELD

The present invention relates to an electrically heated catalytic converter.

BACKGROUND ART

A catalytic converter supporting a catalyst capable of purifying exhaust gas is disposed in the route of an exhaust pipe in order to purify harmful substances contained in exhaust gas discharged from an engine.

To enhance the efficiency of the catalytic converter to purify harmful substances, the temperate inside the catalytic converter must be maintained at a temperature suitable for catalyst activation (hereinafter also referred to as catalyst activation temperature).

In the case of a vehicle not provided with a means that directly heats a catalyst carrier constituting the catalytic converter, the temperature of exhaust gas is low immediately after the vehicle starts running, so that the temperature inside the catalytic converter does not reach the catalyst activation temperature, making it difficult to effectively prevent discharge of harmful substances.

In addition, in the case of a hybrid vehicle not provided with a means that directly heats the catalyst carrier, the temperature inside the catalytic converter decreases while the motor is driven and the engine is stopped, and in some cases, the temperature inside the catalytic converter is lower than the catalyst activation temperature. Also in this case, it is difficult to effectively prevent discharge of harmful substances.

In order to solve these problems, for example, Patent Literature 1 discloses an invention in which the catalyst carrier itself is used as a heating element that generates heat by energization, and the temperature inside the catalytic converter is increased, if necessary, to or above the temperature of the catalyst activation temperature.

CITATION LIST

Patent Literature

Patent Literature 1: JP-A 2013-1.85573

SUMMARY OF INVENTION

Technical Problem

FIG. 3 is a cross-sectional view schematically showing an electrically heated catalytic converter disclosed in Patent Literature 1.

As shown in FIG. 3, an electrically heated catalytic converter 50 includes a catalyst carrier 60 as a heating element, a case 70 for accommodating the catalyst carrier 60, and an insulation mat 80 disposed between the case 70 and the catalyst carrier 60. The case 70 includes an outer tube 71 serving as an external partition wall and an inner tube 74 disposed inside the outer tube 71. The inner tube 74 includes an insulation layer 76 to prevent a short circuit between the inner tube 74 and the catalyst carrier 60.

In addition, the inner tube 74 protrudes toward the central axis of the case 70, and such a protruding portion 74a is exposed to high-temperature heat of exhaust gas. Thus, even when particulate matter (hereinafter referred to as PM) such as soot is attached to the protruding portion 74a, oxidation of PM is accelerated by heat, and PM is removed by combustion. As a result, a short circuit is less likely to occur.

In the electrically heated catalytic converter 50 disclosed in Patent Literature 1, a projecting portion 74a is bent, and if the insulation layer 76 is formed using a spray gun or the like, the insulation layer 76 easily accumulates in the curvature section. Thus, the insulation layer 76 formed on the curvature section tends to be thicker than the insulation layer 76 formed on other portions.

In addition, the curvature section has bent shape. Thus, once the temperature is increased by the flow of exhaust gas into the electrically heated catalytic converter 50, causing residual stress of the curvature sections generated during processing to be released, thermal stress is likely to occur in the curvature section. Due to these factors, the insulation layer 76 formed on the curvature section is subjected to large thermal stress, compared to the insulation layer 76 formed on other portions. Thus, the insulation layer 76 formed on the curvature section is susceptible to damage such as cracking and peeling.

In particular, in the case where damage occurs in the insulation layer 76 formed on the curvature section closest to the catalyst carrier 60, since the distance from the damaged portion to the catalyst carrier 60 is short, unfortunately, insulation cannot be sufficiently maintained after accumulation of PM, thus likely causing a short circuit between the case 70 and the catalyst carrier 60.

The present invention is made in order to solve these problems. The present invention aims to provide a highly durable, electrically heated catalytic converter including an inner tube on which an insulation layer is formed, wherein the insulation layer is less susceptible to damage such as cracking and peeling even when thermal stress occurs in a curvature section of the inner tube where the insulation layer is formed.

Solution to Problem

The present inventors intensively conducted studies to solve the above problems. As a result, they found that thermal stress applied to the insulation layer can be alleviated in the following manner: provided that curvature sections include a first curvature section located closest to a catalyst carrier, a first curvature section insulation layer having a thickness of 100 to 400 µm is formed on the first curvature section; and further, provided that extended sections include a first extended section connected to the first curvature section and adjacent to the catalyst carrier, a first extended section insulation layer is formed on the first extended section, and the thickness of the first curvature section insulation layer is made greater than 1 time to less than 1.4 times the thickness of the first extended section insulation layer. The present invention was completed based on these findings.

Specifically, the present invention provides an electrically heated catalytic converter for purifying exhaust gas, the electrically heated catalytic converter including a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube includes one or more curvature sections curved so as to outwardly project and extended sections connected to the one or more curvature sections, an insulation layer including an amorphous inorganic material is formed at least on an inner surface of the one or more curvature sections and the extended sections of the inner tube, the one or more curvature sections include a first curvature section located closest to the catalyst carrier, the first curvature section has a first curvature section insulation layer formed thereon, the first curvature section insulation layer having a thickness of 100 to 400 μm, the extended sections include a first extended section connected to the first curvature section and adjacent to the catalyst carrier, the first extended section has a first extended section insulation layer formed thereon, and the thickness of the first curvature section insulation layer is greater than 1 time to less than 1.4 times the thickness of the first extended section insulation layer.

In the electrically heated catalytic converter, in a cross section upstream of the catalyst carrier taken along a plane including the central axis of the case, the inner tube includes the one or more curvature sections curved so as to outwardly project and the extended sections connected to the one or more curvature sections. Specifically, the inner tube has a shape that tapers in the upstream direction.

The inner tube may also be described as being protruding into the flow of exhaust gas. Thus, the temperature of the inner tube upstream of the catalyst carrier tends to increase due to exposure to the heat of the exhaust gas. In addition, since there is a space between the inner tube and the outer tube, the transfer of the heat from the inner tube to the outer tube can be suppressed. Owing to these factors, it is possible to efficiently increase the temperature of the inner tube. Thus, even when PM is attached to the inner tube, oxidation of PM is accelerated, and PM can be removed from the inner tube. This makes it possible to prevent a short circuit between the case and the catalyst carrier.

In addition, in the electrically heated catalytic converter, an insulation layer including an amorphous inorganic material is formed at least on an inner surface of the one or more curvature sections and the extended sections of the inner tube. This makes it possible to prevent a short circuit between the case and the catalyst carrier.

Since the insulation layer includes an amorphous inorganic material, the insulation layer can be relatively easily formed by applying a raw material composition containing a powder of the amorphous inorganic material and the like as raw materials and then melting the raw material composition by heat.

In addition, in the electrically heated catalytic converter, the one or more curvature sections include the first curvature section located closest to the catalyst carrier, and the first curvature section insulation layer formed on the first curvature section has a thickness of 100 to 400 μm.

The curvature sections are susceptible to temperature changes, and have bent shapes. Thus, once the temperature is increased causing residual stress of the curvature sections generated during processing to be released, thermal stress is likely to occur in the curvature sections. Thus, the insulation layer formed on the curvature sections is subjected to higher thermal stress than the insulation layer formed in the extended sections is. This means that the insulation layer formed on the curvature sections is a portion susceptible to damage such as cracking and peeling. In particular, in the case where damage occurs in the insulation layer formed on the curvature section closest to the catalyst carrier, since the distance from the damaged portion in the insulation layer to the catalyst carrier is short, unfortunately, insulation cannot be sufficiently maintained after accumulation of PM.

However, the first curvature section insulation layer having a thickness of 100 to 400 μm can sufficiently alleviate the thermal stress applied to the first curvature section insulation layer.

The first curvature section insulation layer having a thickness of less than 100 μm unfortunately provides insufficient insulation, and thus a short circuit may occur between the case and the catalyst carrier. In addition, the insulation layer tends to have insufficient strength and thus becomes susceptible to damage by external shock.

If the thickness of the first curvature section insulation layer is more than 400 μm, the insulation layer will easily have a temperature difference therein and will be susceptible to cracking and the like.

In addition, in the electrically heated catalytic converter, the thickness of the first curvature section insulation layer is greater than 1 time to less than 1.4 times the thickness of the first extended section insulation layer formed on the first extended section. The first extended section is one of the extended sections, and it is connected to the first curvature section and adjacent to the catalyst carrier.

If the thickness of the first curvature section insulation layer is equal to or less than 1 time the thickness of the first extended section insulation layer, the first curvature section insulation layer will unfortunately provide insufficient insulation because the first curvature section insulation layer is thin, and a short circuit may occur between the case and the catalyst carrier. In addition, the insulation layer tends to have insufficient strength and thus becomes susceptible to damage by external shock. If the thickness of the first curvature section insulation layer is equal to or greater than 1.4 times the thickness of the first extended section insulation layer, thermal stress cannot be easily alleviated, and the insulation layer will be susceptible to cracking and peeling due to internal thermal stress.

In the electrically heated catalytic converter of the present invention, the first curvature section may be a first bent section that is linearly bent. In addition, the first curvature section may be a first curved section that is bent in a curve.

In other words, in the electrically heated catalytic converter of the present invention, the effects of the present invention can be achieved regardless of how the first curvature section is bent.

In the electrically heated catalytic converter of the present invention, the angle of the first bent section is preferably 120 to 150°.

If the angel, of the first bent section is 120 to 150°, the inner tube upstream of the catalyst carrier can be arranged to suitably project, making it possible to quickly increase the temperature of the inner tube upstream of the catalyst carrier when exhaust gas flows in, and also to uniformly apply gas to the catalyst carrier. Thus, PM can be suitably removed.

In addition, the first bent section having an angle of 120 to 150° has a shape susceptible to thermal stress. Yet, it is possible to alleviate the effects of thermal stress by controlling the thickness of the first curvature section insulation layer as described above.

In the electrically heated catalytic converter of the present invention, preferably, the first curved section has a curvature radius of 5 to 15 mm.

If the first curved section has a curvature radius of 5 to 15 mm, the inner tube upstream of the catalyst carrier can be arranged to suitably project, making it possible to quickly increase the temperature of the inner tube upstream of the catalyst carrier when exhaust gas flows in, and also to uniformly apply gas to the catalyst carrier. Thus, PM can be suitably removed.

In addition, the first curved section having a curvature radius of 5 to 15 mm has a shape susceptible to thermal stress. Yet, it is possible to alleviate the effects of thermal stress by controlling the thickness of the first curvature section insulation layer as described above.

In the electrically heated catalytic converter of the present invention, preferably, the insulation layer further contains a crystalline inorganic material.

In the electrically heated catalytic converter, since the insulation layer contains a crystalline inorganic material having heat resistance, it is possible to improve the heat resistance of the insulation layer and to mechanically reinforce the insulation layer.

In the electrically heated catalytic converter of the present invention, the crystalline inorganic material contains at least one of calcia, magnesia, ceria, alumina, and an oxide of a transition metal.

In the electrically heated catalytic converter, since the insulation layer contains at least one of calcia, magnesia, ceria, alumina, and an oxide of a transition metal which are heat resistance, it is possible to improve the heat resistance and the mechanical characteristics of the insulation layer.

In the electrically heated catalytic converter of the present invention, preferably, the amorphous inorganic material is formed of low softening point glass having a softening point of 300° C. to 1000° C.

In the electrically heated catalytic converter, the amorphous inorganic material is formed of low softening point glass having a softening point of 300° C. to 1000° C. This makes it possible to relatively easily form the insulation layer by applying the raw material composition containing the low softening point glass to the inner tube and then melting the raw material composition by heat.

If the softening point of the low softening point glass is below 300° C., a layer to be turned into the insulation layer will easily flow due to melting or the like during heat treatment because the softening point is too low, making it difficult to form a layer having a uniform thickness. In contrast, if the softening point of the low softening point glass is above 1000° C., the temperature setting for heat treatment must be very high. Thus, the mechanical characteristics of the inner tube may be degraded by heat.

In the electrically heated catalytic converter of the present invention, preferably, the low softening point glass includes at least one of barium glass, boron glass, strontium glass, alumina silicate glass, soda-zinc glass, and soda-barium glass.

In the electrically heated catalytic converter of the present invention, preferably, a portion of the surface of the inner tube where the insulation layer is to be formed is roughened.

In the electrically heated catalytic converter, roughening the portion of the surface of the inner tube can increase the surface area of the inner tube and improve adhesion between the insulation layer and the inner tube, thus making it possible to form an insulation layer that is less susceptible to peeling even when exposed to temperature changes or the like.

BRIEF DESCRIPTION OF DRAWINGS

FIG. 1 is a cross-sectional view schematically showing an example of the electrically heated catalytic converter according to the present invention.

DESCRIPTION OF EMBODIMENTS

Figure 2A:
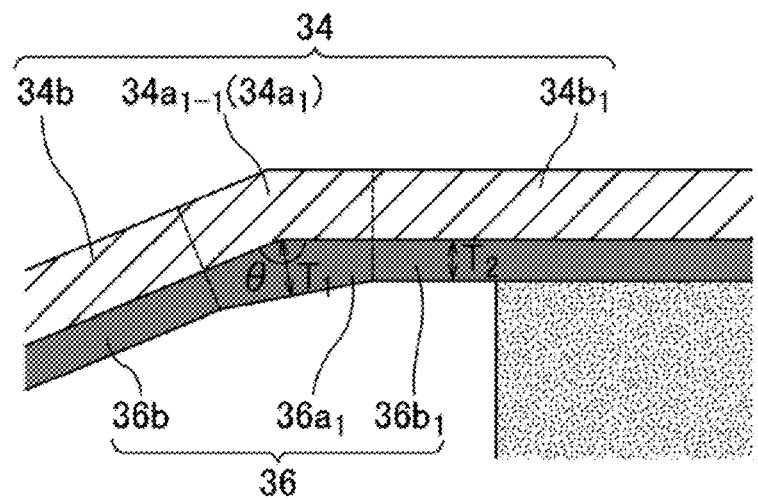
FIG. 2A is an enlarged view showing a portion surrounded by a dashed-line box in FIG. 1 having a first bent section.

The electrically heated catalytic converter of the present invention is described in detail below. The present invention is not limited to the following description, and may be appropriately modified without departing from the gist of the present invention.

The electrically heated catalytic converter of the present invention is an electrically heated catalytic converter for purifying exhaust gas, the electrically heated catalytic converter including a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube includes one or more curvature sections curved so as to outwardly project and extended sections connected to the one or more curvature sections, an insulation layer including an amorphous inorganic material is formed at least on an inner surface of the one or more curvature sections and the extended sections of the inner tube, the one or more curvature sections includes a first curvature section located closest to the catalyst carrier, the first curvature section has a first curvature section insulation layer formed thereon, the first curvature section insulation layer having a thickness of 100 to 400 μm, the extended sections include a first extended section connected to the first curvature section and adjacent to the catalyst carrier, the first extended section has a first extended section insulation layer formed thereon, and the thickness of the first curvature section insulation layer is greater than 1 time to less than 1.4 times the thickness of the first extended section insulation layer.

FIG. 1 is a cross-sectional view showing an example of the electrically heated catalytic converter according to the present invention.

An electrically heated catalytic converter 10 shown in FIG. 1 is provided to an exhaust pipe of an internal combustion engine mounted in a vehicle. The internal combustion engine may be a diesel engine or a gasoline engine. The electrically heated catalytic converter may also be used in a vehicle that employs a hybrid system equipped with an electric motor.

The electrically heated catalytic converter 10 shown in FIG. 1 is a vertical cross-sectional view of the electrically heated catalytic converter 10 taken along an central axis X thereof. FIG. 1 shows only a portion of the electrically heated catalytic converter closer to the engine in the upstream side of a catalyst carrier 20.

As shown in FIG. 1, the electrically heated catalytic converter 10 according to the present invention includes a catalyst carrier 20 supporting a catalyst and configured to generate heat by energization, a case 30 for accommodating the catalyst carrier 20, and an electrical insulation mat 40 interposed between the catalyst carrier 20 and the case 30.

The case 30 has a cylindrical shape having a central axis X as the center, and includes an outer tube 31 disposed at the outermost side and an inner tube 34 disposed inside the outer tube 31.

In addition, as shown in FIG. 1, the inner tube 34 includes curvature sections 34a curved so as to outwardly project, and extended sections 34b connected to the curvature sections 34a.

In other words, the inner tube has a shape that tapers in the upstream direction.

An insulation layer 36 including an amorphous inorganic material is formed on an inner surface of the curvature sections 34a and the extended sections 34b of the inner tube 34.

The inner tube 34 may also be described as being protruding into the flow of exhaust gas (indicated by arrows Y in FIG. 1). Thus, the temperature of the inner tube 34 upstream of the catalyst carrier 20 tends to increase due to exposure to the heat of the exhaust gas. In addition, since there is a space between the inner tube 34 and the outer tube 31, the transfer of the heat from the inner tube 34 to the outer tube 31 can be suppressed. Owing to these factors, it is possible to efficiently increase the temperature of the inner tube 34. Thus, even when PM is attached to the inner tube 34, oxidation of PM is accelerated, and PM can be removed from the inner tube 34. This makes it possible to prevent a short circuit between the case 30 and the catalyst carrier 20.

In addition, the insulation layer 36 including an amorphous inorganic material is formed on an inner surface of the curvature sections 34a and the extended sections 34b of the inner tube 34. This makes it possible to prevent a short circuit between the case 30 and the catalyst carrier 20.

Since the insulation layer 36 includes an amorphous inorganic material, the insulation layer can be relatively easily formed by applying a raw material composition containing a powder of the amorphous inorganic material and the like as raw materials and then melting the raw material composition by heat.

In order to more reliably provide insulation, preferably, the insulation layer 36 is formed both inside and outside the inner tube 34. Alternatively, the insulation layer 36 is preferably provided inside the outer tube 31.

Examples of materials of the case 30 (the outer tube 31 and the inner tube 34) constituting the electrically heated catalytic converter 10 include metals such as stainless steel, steel, iron, and copper, and nickel alloys such as Inconel, Hastelloy, and Invar. In order to improve adhesion between the insulation layer 36 and the inner tube 34 constituting the case 30, a portion of the inner tube 34 where the insulation layer 36 is to be formed may be roughened by sandblasting treatment or with a chemical agent.

The surface roughness $Rz_{JIS}$ of the surface of the inner tube 34, which is obtained by the roughening treatment, is preferably 1.5 to 20 μm. The surface roughness $Rz_{JIS}$ of the roughened surface is a 10-spot average of roughness as defined in JIS B 0601 (2001). The measurement distance is 10 mm.

If the surface roughness $Rz_{JIS}$ of the roughened surface of the inner tube 34 is less than 1.5 μm, it will be difficult to provide sufficient adhesion between the inner tube 34 and the insulation layer 36 due to the small surface area of the inner tube 34. In contrast, if the surface roughness $Rz_{JIS}$ of the roughened surface of the inner tube 34 is more than 20 μm, it will be difficult to form the insulation layer 36 on the surface of the inner tube 34. Presumably, this is because if the surface roughness $Rz_{JIS}$ of the roughened surface of the inner tube 34 is too large, slurry (a raw material composition for the insulation layer) will not flow into depressions of the irregularities formed on the surface of the inner tube 34, thus forming voids in these depressions.

The surface roughness $Rz_{JIS}$ of the roughened surface of the inner tube can be measured using Handy Surf E-35B (Tokyo Seimitsu Co., Ltd.) in accordance with JIS B 0601 (2001), with a measurement distance of 10 mm.

In the electrically heated catalytic converter 10 of the present invention, a preferred lower limit of the thickness of the inner tube 34 is 0.8 mm, a more preferred lower limit is 1.2 mm. A preferred upper limit thereof is 3 mm, and a more preferred upper limit thereof is 2 mm.

The inner tube 34 having a thickness of less than 0.8 mm does not have sufficient strength. The inner tube 34 having a thickness of more than 3 mm cannot be easily formed into a specific shape.

Next, the curvature sections 34a are described in detail.

Figure 2B:
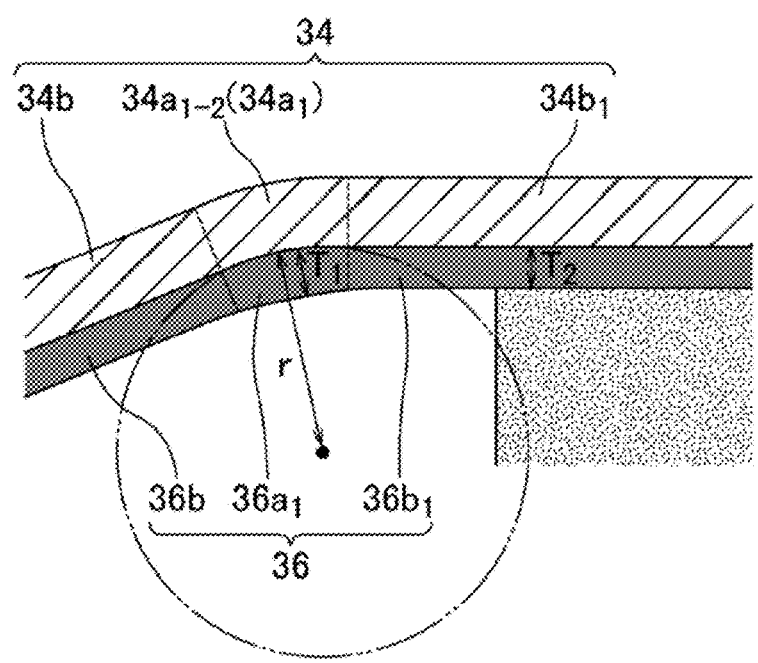
FIG. 2B is an enlarged view showing a portion surrounded by a dashed-line box in FIG. 1 having a first curved section.
Figure 3:
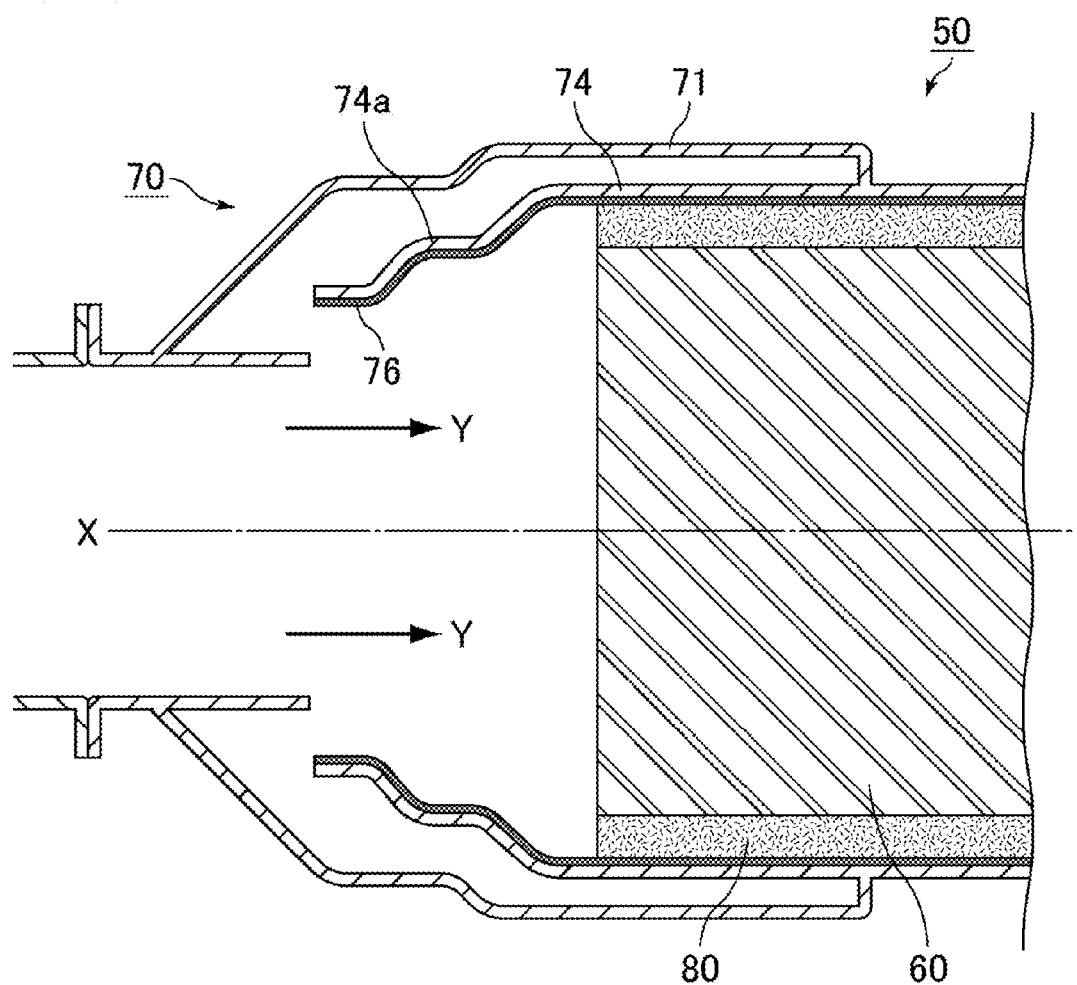
FIG. 3 is a cross-sectional view schematically showing an electrically heated catalytic converter disclosed in Patent Literature 1.

FIGS. 2A and 2B are enlarged views showing a portion surrounded by a dashed-line box in FIG. 1.

As shown in FIG. 1, the inner tube 34 includes two curvature sections 34a, i.e., a first curvature section $34a_1$ and a second curvature section $34a_2$ located adjacent thereto. Of all the curvature sections 34a, the first curvature section $34a_1$ is located closest to the catalyst carrier 20.

In the electrically heated catalytic converter 10, the first curvature section $34a_1$ may be a first bent section $34a_{1-1}$ that is linearly bent as shown in FIG. 2A, or may be a first curved section $34a_{1-2}$ that is bent in a curve as shown in FIG. 2B. In other words, in the electrically heated catalytic converter 10, the effects of the present invention can be achieved regardless of how the first curvature section $34a_1$ is bent.

Herein, the range of the first bent section is the region from a curvature starting point to 3% of the length from the curvature starting point in the entire length of the inner tube, in a cross section taken along a plane including the central axis of the case 30.

In addition, herein, the range of the first curved section is the region where the curvature is 15 mm or less, in a cross section taken along a plane including the central axis of the case 30.

In the electrically heated catalytic converter 10, in the case where the first curvature section $34a_1$ is the first bent section $34a_{1-1}$, the angle θ of the first bent section $34a_{1-1}$ is preferably 120 to 150°, more preferably 125 to 135°.

If the angel of the first bent section $34a_{1-1}$ is 120 to 150°, the inner tube 34 upstream of the catalyst carrier 20 can be arranged to suitably project, making it possible to quickly increase the temperature of the inner tube 34 upstream of the catalyst carrier 20 when exhaust gas flows in, and also to uniformly apply gas to the catalyst carrier 20. Thus, PM can be suitably removed.

In addition, the first bent section $34a_{1-1}$ having an angle of 120 to 150° has a shape susceptible to thermal stress. Yet, as described below, it is possible to alleviate the effects of thermal stress by controlling the thickness of a first curvature section insulation layer $36a_1$ as described later.

In the electrically heated catalytic converter 10, in the case where the first curvature section $34a_1$ is the first curved section $34a_{1-2}$, the curvature radius r of the first curved section $34a_{1-2}$ is preferably 5 to 15 mm, more preferably 5 to 8 mm.

If the curvature radius r of the first curved section $34a_{1-2}$ is 5 to 15 mm, the inner tube 34 upstream of the catalyst carrier 20 can be arranged to suitably project, making it possible to quickly increase the temperature of the inner tube 34 upstream of the catalyst carrier 20 when exhaust gas flows in, and also to uniformly apply gas to the catalyst carrier 20. Thus, PM can be suitably removed.

In addition, the first curved section $34a_{1\text{-}2}$ having a curvature radius r of 5 to 15 mm has a shape susceptible to thermal stress. Yet, as described below, it is possible to alleviate the effects of thermal stress by controlling the thickness of the first curvature section insulation layer $36a_1$ as described later.

In the electrically heated catalytic converter 10, the shape of the second curvature section $34a2$ is not particularly limited, but is preferably the same as the shape of the first curvature section $34a_1$.

The electrically heated catalytic converter 10 shown in FIG. 1, which has been described so far, includes two curvature sections 34a. Yet, in the electrically heated catalytic converter of the present invention, the number of curvature sections may be one or three or more.

In addition, in a cross section taken along a plane including the central axis of the case 30, the extended sections 34b connected to the curvature sections 34a may be linear or curved or may have a shape in which a straight line and a curved line are combined.

Next, the insulation layer 36 is described in detail.

In the electrically heated catalytic converter 10, the thickness of the insulation layer 36 formed on the curvature sections 34a and the extended sections 34b of the inner tube 34 is preferably 100 to 400 µm, more preferably 120 to 200 µm.

The insulation layer 36 having a thickness of 100 to 400 µm can provide sufficient insulation and prevent a short circuit between the inner tube 34 and the catalyst carrier 20.

The insulation layer 36 having a thickness of less than 100 µm is too thin to provide sufficient insulation. In contrast, if the thickness of the insulation layer 36 is more than 400 µm, since insulation layer 36 is too thick, the insulation layer 36 will easily have a temperature difference therein and will be susceptible to cracking and the like.

As shown in FIGS. 2A and 2B, in the electrically heated catalytic converter 10, the first curvature section $34a_1$ has the first curvature section insulation layer $36a_1$ formed thereon, and the extended sections 34b have an extended section insulation layer 36b formed thereon.

In the electrically heated catalytic converter 10, the first curvature section insulation layer $36a_1$ formed on the first curvature section $34a_1$ has a thickness of 100 to 400 µm. Preferably, the thickness of the first curvature section insulation layer $36a_1$ is 120 to 200 µm.

The curvature sections 34a are susceptible to temperature changes and have a bent shape. Thus, once the temperature is increased causing residual stress of the curvature sections 34a generated during processing to be released, thermal stress is likely to occur in the curvature sections 34a. Thus, the insulation layer 36 formed on the curvature sections 34a are subjected to higher thermal stress than the insulation layer 36 formed in the extended sections 34b. This means that the insulation layer 36 formed on the curvature sections 34a is a portion susceptible to damage such as cracking and peeling. In particular, in the case where damage occurs in the insulation layer 36 formed on the curvature section 34a closest to the catalyst carrier 20 (i.e., on the first curvature section $34a_1$), since the distance from the damaged portion in the insulation layer 36 to the catalyst carrier 20 is short, unfortunately, insulation cannot be sufficiently maintained after accumulation of PM.

However, the first curvature section insulation layer $36a_1$ having a thickness of 100 to 400 µm can sufficiently alleviate the thermal stress applied to the first curvature section insulation layer $36a_1$.

The first curvature section insulation layer $36a_1$ having a thickness of less than 100 µm unfortunately provides insufficient insulation, and thus a short circuit may occur between the case 30 and the catalyst carrier 20. In addition, the insulation layer 36 tends to have insufficient strength and thus becomes susceptible to damage by external shock.

If the thickness of the first curvature section insulation layer $36a_1$ is more than 400 µm, the insulation layer 36 will easily have a temperature difference therein and will be susceptible to cracking and the like.

The term "the thickness of the first curvature section insulation layer" means the maximum thickness of the first curvature section insulation layer, and refers to the thickness indicated by $T_1$ in FIGS. 2A and 2B.

In the electrically heated catalytic converter 10, the thickness of the first curvature section insulation layer $36a_1$ is greater than 1 time to less than 1.4 times the thickness of a first extended section insulation layer $36b_1$ formed on a first extended section $34b_1$. The first extended section $34b_1$ is one of the extended sections 34b, and it is connected to the first curvature section $34a_1$ and adjacent to the catalyst carrier 20. In addition, the thickness of the first curvature section insulation layer $36a_1$ is preferably greater than 1 time to equal to or less than 1.35 times, more preferably 1.1 to 1.3 times the thickness of the first extended section insulation layer $36b_1$.

If the thickness of the first curvature section insulation layer $36a_1$ is equal to or less than 1 time the thickness of the first extended section insulation layer $36b_1$, the first curvature section insulation layer $36a_1$ will unfortunately provide insufficient insulation because the first curvature section insulation layer $36a_1$ is thin, and a short circuit may occur between the case 30 and the catalyst carrier 20. In addition, the insulation layer 36 tends to have insufficient strength and thus becomes susceptible to damage by external shock. If the thickness of the first curvature section insulation layer $36a_1$ is equal to or greater than 1.4 times the thickness of the first extended section insulation layer $36b_1$, thermal stress cannot be easily alleviated, and the insulation layer 36 will be susceptible to cracking and peeling due to internal thermal stress.

The term "the thickness of the first extended section insulation layer" as used herein means the minimum thickness of the first extended section insulation layer, and refers to the thickness indicated by $T_2$ in FIGS. 2A and 2B.

In addition, the first extended section $34b_1$ herein includes a portion abutting the mat 40.

In the electrically heated catalytic converter 10, the thickness of the insulation layer formed on the second curvature section $34a_2$ is not particularly limited, but is preferably the same as the thickness of the first curvature section insulation layer $36a_1$ formed on the first curvature section $34a_1$.

In the electrically heated catalytic converter 10, preferably, the insulation layer 36 includes an amorphous inorganic material, or includes an amorphous inorganic material and particles of a crystalline inorganic material dispersed inside a layer including the amorphous inorganic material.

Preferably, the amorphous inorganic material constituting the insulation layer 36 is formed of low softening point glass having a softening point of 300° C. to 1000° C.

In the electrically heated catalytic converter 10 of the present invention, in the case where an amorphous inorganic material is formed of low softening point glass having a softening point of 300° C. to 1000° C., the insulation layer 36 can be relatively easily formed by applying a raw material composition containing the low softening point glass to the inner tube 34 and then melting the raw material composition by heat.

If the softening point of the low softening point glass is below 300° C., a layer to be turned into the insulation layer 36 will easily flow due to melting or the like during heat treatment because the softening point is too low, making it difficult to form a layer having a uniform thickness. In contrast, if the softening point of the low softening point glass is above 1000° C., the temperature setting for heat treatment must be very high. Thus, the mechanical characteristics of the inner tube 34 may be degraded by heat.

Preferably, the low softening point glass includes at least one of barium glass, boron glass, strontium glass, alumina silicate glass, soda-zinc glass, and soda-barium glass. These kinds of glass may be used alone or in mixture of two or more thereof.

The crystalline inorganic material that may be contained in the insulation layer 36 includes at least one of calcia, magnesia, ceria, alumina, and an oxide of a transition metal. Examples of the oxide of a transition metal include zirconia, yttria, niobium oxide, titania, chromium oxide, manganese oxide, iron oxide, copper oxide, cobalt oxide, and chromium oxide.

The crystalline inorganic material, may also include oxides such as zirconia, for example, yttria stabilized-zirconia, CaO-stabilized zirconia, MgO-stabilized zirconia, zircon, CeO-stabilized zirconia, etc.

The crystalline inorganic materials in the insulation layer 36 can improve heat resistance and mechanical characteristics of the insulation layer 36.

In the case where the insulation layer 36 contains particles of the crystalline inorganic material, the average particle size of the particles of the crystalline inorganic material is preferably 0.1 to 50 μm, more preferably 0.1 μm or more and less than 10 μm.

If the average particle size of the particles of the crystalline inorganic material is in the range of 0.1 to 50 μm, the surface area of the crystalline inorganic material in a melting layer will be in an adequate rage when the melting layer is formed by applying a raw material composition to the surface of the inner tube 34 and then heating. Thus, the viscosity of a coating layer in a molten state will be maintained in an appropriate range without becoming too low, and the insulation layer 36 having a uniform thickness can be formed.

If the average particle size of the particles of the crystalline inorganic material in the insulation layer 36 is less than 0.1 μm, the surface area of the particles of the crystalline inorganic material in the melting layer will be too large because the particle size of the crystalline inorganic material particles is too small, excessively increasing the viscosity of the melting layer containing the particles of the crystalline inorganic material. Thus, the insulation layer 36 having a uniform thickness cannot be formed.

In contrast, if the average particle size of the particles of the crystalline inorganic material is more than 50 μm, the surface area of the particles of the crystalline inorganic material in the melting layer will be too small because the particle size of the crystalline inorganic material particles is too large, reducing the viscosity of the melting layer containing the particles of the crystalline inorganic material. Thus, the resulting melting layer will easily flow, and the insulation layer 36 to be formed will be thin.

In the case where the insulation layer 36 contains the crystalline inorganic material, the proportion of the crystalline inorganic material is preferably 5 to 70% by weight, more preferably 20 to 70% by weight, relative to the entire insulation layer 36.

If the proportion of particles of the crystalline inorganic material is in the range of 5 to 70% by weight relative to the entire insulation layer 36, the weight proportion of the crystalline inorganic material in the melting layer will be in an adequate range when the melting layer is formed by applying a raw material composition to the surface of the inner tube 34 and then heating. Thus, the viscosity of a coating layer in a molten state will be maintained in an appropriate range without becoming too low, and the insulation layer 36 having a uniform thickness can be formed.

The electrically heated catalytic converter 10 of the present invention includes the catalyst carrier 20. The catalyst carrier 20 includes a ceramic honeycomb structured body formed from porous ceramic or the like. Exhaust gas flows into through holes, each of which is opened at both end faces on the exhaust gas inlet side and the exhaust gas outlet side, and the exhaust gas is purified by the action of the catalyst carried on a partition wall separating the through holes from each other.

The catalyst carrier 20 constituting the electrically heated catalytic converter 10 of the present invention is configured to generate heat by energization, and is formed using a ceramic material having a specific resistance, such as silicon carbide.

Fired bodies of such porous materials are brittle and thus easily broken by mechanical shock or the like. However, in the electrically heated catalytic converter 10 of the present invention, the electrical insulation mat 40 is disposed around the lateral side of the catalyst carrier 20 to absorb shock, making it possible to prevent cracking and the like in the catalyst carrier 20 resulting from mechanical shock and thermal shock.

Preferably, the electrical insulation mat 40 constituting the electrically heated catalytic converter 10 of the present invention is a mat containing inorganic fibers. The inorganic fibers constituting the mat are not particularly limited, and may be alumina-silica fibers, alumina fibers, silica fibers, or the like. Alternatively, glass fibers or biosoluble fibers may be used. The kind of inorganic fibers may be changed, for example, in accordance with characteristics (such as heat resistance and resistance to wind-induced erosion) required of the mat. It is preferred to use fibers having a diameter and a length conformable to environmental regulations of individual countries.

The following description is given of a method for forming the insulation layer in the inner tube constituting the electrically heated catalytic converter of the present invention.

A raw material composition for forming the insulation layer contains particles of only amorphous inorganic material or contains particles of both amorphous inorganic material and crystalline inorganic material. The raw material composition may also contain a dispersion medium, an organic binder, and the like.

In the case where the raw material composition for forming the insulation layer contains the crystalline inorganic material, as described above, the weight proportion of the crystalline inorganic material is preferably 5 to 70% by weight, more preferably 20 to 70% by weight, relative to the total amount of the amorphous inorganic material and the crystalline inorganic material. In this case, the average particle size of the particles of the crystalline inorganic material is preferably 0.1 to 50 μm.

When the amorphous inorganic material in the raw material composition is applied to the surface of the inner tube and heated, the amorphous inorganic material is melted and a layer of the amorphous inorganic material is formed. Thus, there is no need to strictly control the particle size of the amorphous inorganic material; however, the particles of the amorphous inorganic material must be uniformly dispersed in the raw material composition for forming the insulation layer.

In this aspect, the average particle size of the particles of the amorphous inorganic material in the raw material composition is preferably 0.1 to 100 μm, more preferably 1 to 20 μm. The particles having an average particle size in the range of 1 to 20 μm, which are presumably less affected by electrostatic charge on the particle surface, can be easily uniformly dispersed.

Examples of the dispersion medium include water and organic solvents such as methanol, ethanol, and acetone. The ratio of the powder of amorphous inorganic material, to the dispersion medium to be contained in the raw material composition is not particularly limited. For example, the amount of the dispersion medium is preferably 50 to 150 parts by weight relative to 100 parts by weight of the powder of the amorphous inorganic material, because the raw material composition will have a viscosity suitable for application to the inner tube.

Examples of organic binders that can be added to the raw material composition for forming the insulation layer include polyvinyl alcohol, methyl cellulose, ethyl cellulose, and carboxymethyl cellulose. These may be used alone or in combination of two or more thereof. The dispersion medium and the organic binder can be used together.

The following description is given on specific steps for forming the insulation layer in the inner tube.

(1) Inner Tube Pretreatment Step

First, it is preferred to perform washing treatment to remove impurities from the surface of the inner tube.

The washing treatment is not particularly limited, and any conventionally known washing treatment can be used. Specific examples include methods such as ultrasonic cleaning in an alcohol solvent.

In addition, after the washing treatment, roughening treatment may be performed on the surface of the inner tube, if necessary, in order to increase the specific surface area of the inner tube or to adjust the roughness of the surface of the inner tube. Specific examples of roughening treatment include sandblasting treatment, etching treatment, and high temperature oxidation treatment. These treatments may be used alone or in combination of two or more thereof. Additional washing treatment may be performed after the roughening treatment.

(2) Step of Forming the Insulation Layer in the Inner Tube

First, an amorphous inorganic material, an organic binder, a dispersion medium, and the like are mixed to prepare a raw material composition for forming the insulation layer. Particles of a crystalline inorganic material may be added, if necessary.

Specifically, for example, a powder of an amorphous inorganic material and a powder of a crystalline inorganic material that is added if necessary are prepared to have a specific particle size, a specific shape, and the like. Then, these powders are dry-mixed at a specific ratio to prepare a powder mixture. Further, water, an organic binder, and the like are added to and wet-mixed with the powder mixture in a ball mill. Thus, a raw material composition for forming the insulation layer was prepared.

The ratio of water to a powder of an amorphous inorganic material and the like is not particularly limited. Yet, the amount of water is preferably about 100 parts by weight relative to 100 parts by weight of a powder of an amorphous inorganic material, and the like, because the raw material, composition will have a viscosity suitable for application to the inner tube. As described above, a dispersion medium and the like (for example, an organic solvent) may also be added to the raw material composition for forming the insulation layer, if necessary.

(3) Next, the Raw Material Composition for Forming the Insulation Layer is Applied to the Surface of the Inner Tube.

The raw material composition can be applied by a method such as spray coating, electrostatic coating, ink-jet printing, transfer (transfer using a stamp, a roller, or the like), brushing, or electrodeposition coating.

At this point, the amount of the raw material composition to be applied to the first curvature section is adjusted to be more than 1 time to less than 1.4 times the amount of the raw material composition to be applied to the extended sections, whereby the first curvature section insulation layer can be made to have a thickness greater than 1 time to less than 1.4 times the thickness of the first extended section insulation layer.

The amount of the raw material composition to be applied by, for example, spray coating, can be adjusted by controlling the duration of spraying on each portion.

(4) Subsequently, Heat Treatment is Performed on the Inner Tube in which a Coating Film for the Insulation Layer is Formed.

Specifically, the insulation layer is formed by first drying the metal inner tube to which the raw material composition has been applied and then heating.

The heating temperature is preferably equal to or higher than the softening point of the amorphous inorganic material. The heating temperature is preferably 700° C. to 1100° C., although it depends on the kind of amorphous inorganic material. The heating temperature is preferably equal to or higher than the softening point of the amorphous inorganic material because it makes it possible to achieve strong adhesion between the inner tube and the amorphous inorganic material and to form an insulation layer that is strongly adhered to the inner tube.

The effects of the electrically heated catalytic converter of the present invention are listed below.

(1) In the electrically heated catalytic converter of the present invention, an insulation layer including an amorphous inorganic material is formed at least on an inner surface of the one or more curvature sections and the extended sections of the inner tube. This makes it possible to prevent a short circuit between the case and the catalyst carrier.

(2) In the electrically heated catalytic converter of the present invention, one or more curvature sections include the first curvature section located closest to the catalyst carrier, and the first curvature section insulation layer formed on the first curvature section has a thickness of 100 to 400 μm. The curvature sections are susceptible to temperature changes and have bent shapes. Thus, once the temperature is increased causing residual stress of the curvature sections generated during processing to be released, thermal stress is likely to occur in the curvature sections. Thus, the insulation layer formed on the curvature sections is subjected to higher thermal stress than the insulation layer formed in the extended sections is. This means that the insulation layer formed on the curvature sections is a portion susceptible to damage such as cracking and peeling.

However, the first curvature section insulation layer having a thickness of 100 to 400 μm can sufficiently alleviate the thermal stress applied to the first curvature section insulation layer.

(3) In the electrically heated catalytic converter of the present invention, the thickness of the first curvature section insulation layer is greater than 1.0 time to less than 1.4 times the thickness of the first extended section insulation layer formed on the first extended section. The first extended section is one of the extended sections and it is connected to the first curvature section and adjacent to the catalyst carrier. Thus, the first curvature section insulation layer is sufficiently thick and provides sufficient insulation, making it possible to prevent a short circuit between the case and the catalyst carrier. In addition, the insulation layer has sufficient strength and thus less susceptible to damage by external shock. Also, since the first curvature section insulation layer is not too thick, thermal stress can be easily alleviated, and it is possible to prevent cracking and peeling in the insulation layer due to internal thermal stress.

EXAMPLES

Examples that more specifically disclose the electrically heated catalytic converter of the present invention are described below. The present invention is not limited to these examples.

Example 1

(1) Provision of a Cylindrical Body

A stainless-steel (SUS 430) cylindrical body was provided. The shape of the cylindrical body was substantially the same as that of inner tube 34 shown in FIG. 1. The cylindrical body included a first curvature section and a second curvature section that were curved so as to outwardly project in a cross section taken along a plane including the central axis, and the cylindrical body tapered toward the upstream side. The first curvature section and the second curvature section were bent in a curve, and the curvature radius of each curvature section was 8 mm. In the cylindrical body, the diameter of a portion having a largest diameter was 105 mm, the diameter of a portion having a smallest diameter was 60 mm, and the thickness was 1.5 mm. This cylindrical body was washed by ultrasonic cleaning in an alcohol solvent.

Next, the inner side of the cylindrical body was roughened by sandblasting treatment. The sandblasting treatment was performed using #100 $Al_2O_3$ abrasive grains for 10 minutes.

The surface roughness on the inner side of the cylindrical body was measured using a surface roughness meter (Handy Surf E-35B, Tokyo Seimitsu Co., Ltd.), with a measurement distance of 10 mm. As a result, the surface roughness on the inner side of the cylindrical body had $Rz_{JIS}$ of 5 μm.

(2) Preparation of the Raw Material Composition for Forming the Insulation Layer Barium silicate glass (softening point of 770° C.) was provided as a powder of the amorphous inorganic material. The concentration of the amorphous inorganic material was 51% by weight relative to the entire raw material composition. The term "concentration" refers to the proportion in percentage of the amorphous inorganic material relative to the total amount of the raw material composition for forming the insulation layer including water and the like.

In addition, methyl cellulose was provided as an organic binder, and added in such a manner that its concentration would be 5% by weight relative to the entire raw material composition for forming the insulation layer.

For preparation of the coating composition for forming the insulation layer, water was also added in such manner that the proportion of water would be 100 parts by weight relative to 100 parts by weight of the powder of the amorphous inorganic material, and particles of α-alumina (average particle size: 10 μm) were also added in an amount of 15 parts by weight. These components were wet-mixed in a ball mill. Thus, a raw material composition was obtained.

The average particle size of the α-alumina particles was obtained using a laser diffraction particle size analyzer (SALD-300V, Shimadzu Corporation).

(3) Formation of the Insulation Layer

The prepared raw material composition was applied to the inner side of the cylindrical body by a spray coating method, and dried in a drying apparatus at 100° C. for 60 minutes. During application by a spray coating method, in order to adjust the thickness of the first curvature section insulation layer $36a_1$ and the first extended section insulation layer $36b_1$, the duration of spraying was adjusted in such a manner that the duration of spraying on the first curvature section $34a_1$ was 1.3 times longer than the duration of spraying on the first extended section $34b_1$.

Subsequently, heat treatment was performed at 820° C. for 180 minutes to form an insulation layer on the inner side of the cylindrical body. Thus, a cylindrical body including the insulation layer according to Example 1 was prepared.

Example 2 and Comparative Examples 1 and 2

A cylindrical body including an insulation layer according to Example 2 and Comparative Examples 1 and 2 were prepared in the same manner as in Example 1 except for changing the thickness of the first curvature section insulation layer $36a_1$ and the first extended section insulation layer $36b_1$ as shown in Table 1.

(Measurement of the Layer Thickness)

The thickness of each insulation layer formed on the inner side of the cylindrical bodies obtained in each example and each comparative example was measured with Dual Scope MP40 (Fischer Instruments K.K.).

Table 1 shows the thickness of the first curvature section insulation layer $36a_1$ and the first extended section insulation layer $36b_1$ on the inner tube 34, as measured in the manner described above.

(Evaluation of Initial Insulation of the Insulation Layer)

In each of the cylindrical bodies obtained in each example and each comparative example, Cu particles were applied to the surface of the insulation layer 36 by sputtering, and a pair of electrodes was placed on the surface of the insulation layer 36 and the outer surface of each cylindrical body. Next, a DC voltage of 500 V was applied across the pair of electrodes, and the resistance on the surface of the insulation layer 36 and the outer surface of the cylindrical body were measured using a resistance meter. The resistance meter was Digital Ultra-High Resistance/Micro Current Meter (R8340, Advantest Corporation). With respect to the insulation layer 36 having a thickness of 100 μm or more, if the resistance between the surface of the insulation layer 36 and the outer surface of the cylindrical body was $4.0 \times 10^4 \Omega$ or higher, the insulation layer 36 was evaluated as having insulation and indicated by A; and if the resistance was lower than 4.0×10$^4$Ω, the insulation layer 36 was evaluated as not having insulation and indicated by B. Table 1 shows the results.

(Evaluation of Durability by Thermal Test)

The cylindrical bodies obtained in each example and each comparative example were heated to 800° C. In this state, each cylindrical body was placed on a room-temperature, thick metal plate, and was naturally cooled to 150° C. in five minutes. Subsequently, the cylindrical bodies were collected, and the conditions of the insulation layers were visually observed to check for cracking and peeling. Table 1 shows the results. Table 1 shows the results. In Table 1, the cylindrical bodies without defects such as cracking and peeling were indicated by A; and the cylindrical bodies with defects such as cracking and peeling were indicated by B.

TABLE 1

|  | Thickness of the first curvature section insulation layer (μm) | Thickness of the first extended section insulation layer (μm) | (Thickness of the first curvature section insulation layer)/ (Thickness of the first extended section insulation layer) | Initial insulation | Peeling and cracking after thermal test |
| --- | --- | --- | --- | --- | --- |
| Example 1 | 100 | 77 | 1.3 | A | A |
| Example 2 | 200 | 307 | 1.3 | A | A |
| Comparative Example 1 | 420 | 200 | 2.1 | A | B |
| Comparative Example 2 | 80 | 30 | 2.0 | B | B |

As shown in Table 1, the cylindrical bodies according to Examples 1 and 2 and Comparative Example 1 were evaluated as having excellent initial insulation. This is presumably because these cylindrical bodies had sufficient insulation owing to their thick insulation layers. In contrast, the cylindrical body according to Comparative Example 2 exhibited poor initial insulation. This is presumably because the insulation layer in the cylindrical body according to Comparative Example 2 was thin.

In addition, as shown in Table 1, the cylindrical bodies according to Examples 1 and 2 were evaluated as having excellent durability as determined by the thermal test. The reason for the excellent durability of the cylindrical bodies according to Examples 1 and 2 as determined by the thermal test is presumably that stress was less likely to occur since the thickness of the first curvature section insulation layer was more than 1 time to less than 1.4 times the thickness of the first extended section insulation layer.

The cylindrical bodies according to Comparative Examples 1 and 2 were evaluated as having poor durability was determined by the thermal test. The reason is presumably that stress occurred to a degree that caused peeling or the like since the thickness of the first curvature section insulation layer was more than 1.4 times the thickness of the first extended section insulation layer.

REFERENCE SIGNS LIST 10, 50 electrically heated catalytic converter
20, 60 catalyst carrier
30, 70 case
31, 71 outer tube
34, 74 inner tube
34a curvature section
34a$_1$ first curvature section
34a$_{1-1}$ first bent section
34a$_{1-2}$ first curved section
34a$_2$ second curvature section
34b extended section
34b$_1$ first extended section
36, 76 insulation layer
36a$_1$ first curvature section insulation layer
36b extended section insulation layer
36b$_1$ first extended section insulation layer
40, 80 mat

The invention claimed is:

1. An electrically heated catalytic converter for purifying exhaust gas, the electrically heated catalytic converter comprising:
   a catalyst carrier supporting a catalyst and configured to generate heat by energization;
   a case for accommodating the catalyst carrier; and
   an electrical insulation mat interposed between the catalyst carrier and the case,
   wherein the case comprises an outer tube disposed at the outermost side and an inner tube disposed inside the outer tube;
   in a cross section upstream of the catalyst carrier taken along a plane including the central axis of the case, the inner tube comprises one or more curvature sections curved so as to outwardly project and extended sections connected to the one or more curvature sections,
   an insulation layer comprising an amorphous inorganic material is formed at least on an inner surface of the one or more curvature sections and the extended sections of the inner tube,
   the one or more curvature sections comprise a first curvature section located closest to the catalyst carrier,
   the first curvature section has a first curvature section insulation layer formed thereon, the first curvature section insulation layer having a thickness of 100 to 400 μm,
   the extended sections comprise a first extended section connected to the first curvature section and adjacent to the catalyst carrier,
   the first extended section has a first extended section insulation layer formed thereon, and
   the thickness of the first curvature section insulation layer is greater than 1 time to less than 1.4 times the thickness of the first extended section insulation layer.

2. The electrically heated catalytic converter according to claim 1,
   wherein the first curvature section is a first bent section that is linearly bent.

3. The electrically heated catalytic converter according to claim 2,
   wherein the angle of the first bent section is 120 to 150°.

4. The electrically heated catalytic converter according to claim 1, wherein the first curvature section is a first curved section that is bent in a curve.

5. The electrically heated catalytic converter according to claim 4,
wherein the first curved section has a curvature radius of 5 to 15 mm.

6. The electrically heated catalytic converter according to claim 1,
wherein the insulation layer further comprises a crystalline inorganic material.

7. The electrically heated catalytic converter according to claim 6,
wherein the crystalline inorganic material comprises at least one of calcia, magnesia, ceria, alumina, and an oxide of a transition metal.

8. The electrically heated catalytic converter according to claim 1,
wherein the amorphous inorganic material is formed of low softening point glass having a softening point of 300° C. to 1000° C.

9. The electrically heated catalytic converter according to claim 8,
wherein the low softening point glass comprises at least one of barium glass, boron glass, strontium glass, alumina silicate glass, soda-zinc glass, and soda-barium glass.

10. The electrically heated catalytic converter according to claim 1,
wherein a portion of the surface of the inner tube where the insulation layer is to be formed is roughened.

* * * * *